(12) United States Patent
Balan et al.

(10) Patent No.: US 9,777,841 B2
(45) Date of Patent: Oct. 3, 2017

(54) TRUNNION BALL VALVE SEAT WITH V-SECTION SPRING

(75) Inventors: Mircea Balan, Moore, OK (US); Steven Burrows, Oklahoma City, OK (US)

(73) Assignee: Cameron International Corporation, Houston, TX (US)

(*) Notice: Subject to any disclaimer, the term of this patent is extended or adjusted under 35 U.S.C. 154(b) by 1051 days.

(21) Appl. No.: 12/983,806

(22) Filed: Jan. 3, 2011

(65) Prior Publication Data
US 2012/0167987 A1 Jul. 5, 2012

(51) Int. Cl.
F16J 15/34 (2006.01)
F16K 5/06 (2006.01)
F16K 5/20 (2006.01)

(52) U.S. Cl.
CPC ......... *F16J 15/3452* (2013.01); *F16K 5/0673* (2013.01); *F16K 5/201* (2013.01); *Y10T 137/0318* (2015.04)

(58) Field of Classification Search
CPC ...... F16K 5/0689; F16K 5/0673; F16K 5/201; F16J 15/3452
USPC ........................................ 251/314, 316, 180
See application file for complete search history.

(56) References Cited

U.S. PATENT DOCUMENTS

| | | | |
|---|---|---|---|
| 3,211,421 A | 10/1965 | Johnson et al. | |
| 3,269,692 A | 8/1966 | Shafer | |
| 3,480,253 A | 11/1969 | Priese et al. | |
| 3,521,855 A | 7/1970 | Jensen | |
| 4,111,393 A | 9/1978 | McClurg et al. | |
| 4,135,545 A | 1/1979 | Fowler et al. | |
| 4,157,170 A * | 6/1979 | McClurg | F16K 5/0668 251/315.01 |
| 4,258,901 A * | 3/1981 | Zinnai | F16K 5/0668 251/173 |
| 4,272,054 A | 6/1981 | Zinnai | |
| 4,304,392 A | 12/1981 | Maciulaitis | |

(Continued)

FOREIGN PATENT DOCUMENTS

| | | |
|---|---|---|
| DE | 2312839 A1 | 9/1974 |
| DE | 19712581 A1 | 10/1998 |

(Continued)

OTHER PUBLICATIONS

International Search Report and Written Opinion mailed Mar. 6, 2012 in PCT Application No. PCT/US11/065667.

(Continued)

*Primary Examiner* — Craig Schneider
*Assistant Examiner* — Kelsey Rohman
(74) *Attorney, Agent, or Firm* — Fletcher Yoder, P.C.

(57) ABSTRACT

The disclosed embodiments include systems and methods for energizing a ball valve seat assembly. In particular, the disclosed embodiments are directed toward energizing devices that generate linear or substantially linear energizing forces. In other words, as a seat of the ball valve translates axially with respect to a ball of the ball valve, the resulting energizing force that biases the seat ring back toward the ball is substantially directly proportional to the amount of axial translation. In certain embodiments, the linear energizing device includes an annular cantilevered v-shaped spring having a generally constant cross-sectional profile, including a pair of legs extending from a curved end.

33 Claims, 7 Drawing Sheets

(56) References Cited

U.S. PATENT DOCUMENTS

| | | | |
|---|---|---|---|
| 4,386,756 A * | 6/1983 | Muchow | 251/172 |
| 4,428,561 A | 1/1984 | Thompson | |
| 4,477,055 A | 10/1984 | Partridge | |
| 4,483,511 A * | 11/1984 | Kushida et al. | 251/174 |
| 4,519,412 A * | 5/1985 | Grazioli | 137/72 |
| 4,566,482 A | 1/1986 | Stunkard | |
| 4,911,408 A | 3/1990 | Kemp | |
| 4,911,413 A | 3/1990 | Baba et al. | |
| 5,137,259 A * | 8/1992 | Stein | 251/174 |
| 5,267,722 A | 12/1993 | Coulter | |
| 6,202,981 B1 * | 3/2001 | Davis et al. | 251/143 |
| 2004/0200988 A1 | 10/2004 | Lorenz et al. | |
| 2004/0256591 A1 | 12/2004 | Latzer et al. | |

FOREIGN PATENT DOCUMENTS

| | | | |
|---|---|---|---|
| FR | 1261953 A | 5/1961 | |
| GB | 2105010 A | 3/1983 | |
| GB | 2140534 A | 11/1984 | |
| JP | 2007/232019 A | 9/2007 | |

OTHER PUBLICATIONS

International Search Report and Written Opinion mailed Mar. 6, 2012 in PCT Application No. PCT/US11/065663.
U.S. Appl. No. 12/983,800, filed Jan. 3, 2011, Mircea Balan et al.

* cited by examiner

TRUNNION BALL VALVE SEAT WITH V-SECTION SPRING

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves may be employed to enable or block a flow of fluid in a variety of applications. Ball valves may include a body, an adapter, a rotatable ball disposed within the body and adapter, and a stem coupled to the ball. In addition, ball valves may include a method to ensure that the ball is held in place between the body and the adapter, and a device to ensure that the seat is held against the ball. However, these devices are often characterized by non-linear load curves. In other words, as the seat moves axially toward the body or adapter, the resulting opposing force increases somewhat exponentially, as opposed to linearly.

SUMMARY OF THE INVENTION

The disclosed embodiments include systems and methods for energizing a ball valve seat assembly. In particular, the disclosed embodiments are directed toward energizing devices that generate linear energizing forces. In other words, as a ball of the ball valve translates axially with respect to a seat ring of the ball valve seat assembly, the resulting energizing force that biases the seat ring back toward the ball is substantially directly proportional to the amount of axial translation. In certain embodiments, the linear energizing device includes an annular cantilevered v-shaped spring having a generally constant cross-sectional profile, including a pair of legs extending from a curved end.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include systems and methods for energizing a ball valve seat assembly. In particular, the disclosed embodiments are directed toward energizing devices that generate linear energizing forces. In other words, as a ball of the ball valve translates axially with respect to a seat ring of the ball valve seat assembly, the resulting energizing force that biases the seat ring back toward the ball is substantially directly proportional to the amount of axial translation. In certain embodiments, the linear energizing device includes an annular cantilevered v-shaped spring having a generally constant cross-sectional profile, including a pair of legs extending from a curved end.

Figure 1:
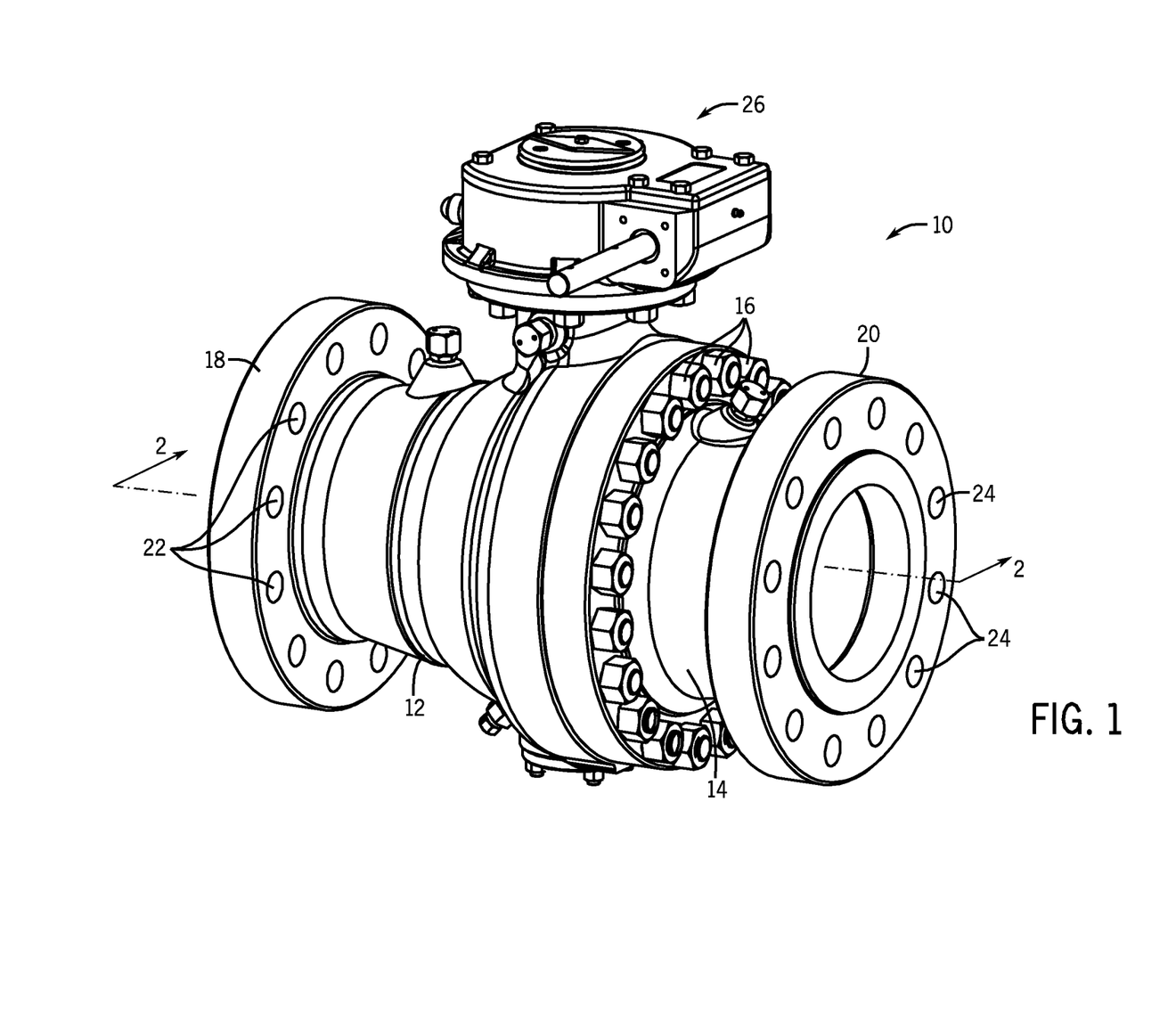
FIG. 1 is a perspective view of a ball valve configured to enable or block a flow of fluid.

Turning now to the figures, FIG. 1 is a perspective view of a ball valve 10 configured to enable or block a flow of fluid. As illustrated, the ball valve 10 includes an annular body 12 and an annular adapter 14. The body 12 and the adapter 14 of the ball valve 10 are configured to mate with each other such that a seal is created between the body 12 and the adapter 14. In particular, in certain embodiments, the adapter 14 is configured to be coupled to the body 12 via a plurality of fasteners 16. In an alternative embodiment, the adapter 14 may be secured to the body 12 by a welded connection. In such an embodiment, the fasteners 16 may be omitted. The body 12 and the adapter 14 also include a body flange 18 and an adapter flange 20, respectively. The flanges 18, 20 are configured to seal and secure the ball valve 10 to other fluid conduits. As will be appreciated, fasteners may pass through openings 22, 24 in the flanges 18, 20, respectively, and corresponding openings within respective conduits to secure the body 12 and the adapter 14 to the conduits.

As described in greater detail below, the ball valve 10 includes a ball configured to rotate from an open position to a closed position. The ball includes a bore that facilitates the passage of fluid through the ball valve 10. In the open position, the bore of the ball is aligned with bores of the body 12 and the adapter 14, such that fluid may pass through the ball valve 10. In the closed position, the bore is rotated perpendicular to the body 12 and the adapter 14, thereby substantially blocking the passage of fluid through the ball valve 10. As will be appreciated, rotating the ball to an orientation between the open and closed positions may enable or block a flow of fluid through the ball valve 10 by adjusting the fluid passage area. As described in greater detail below, the ball is rotationally coupled to a stem such that rotation of the stem causes the ball to rotate. Furthermore, the stem may be coupled to an actuator 26 configured to mount with a variety of valve control components. For example, the actuator 26 may be an electric or hydraulic actuator configured to control the position of the ball within the ball valve 10. Alternatively, the stem may be coupled to a handle such that the ball valve 10 may be operated manually.

Figure 2:
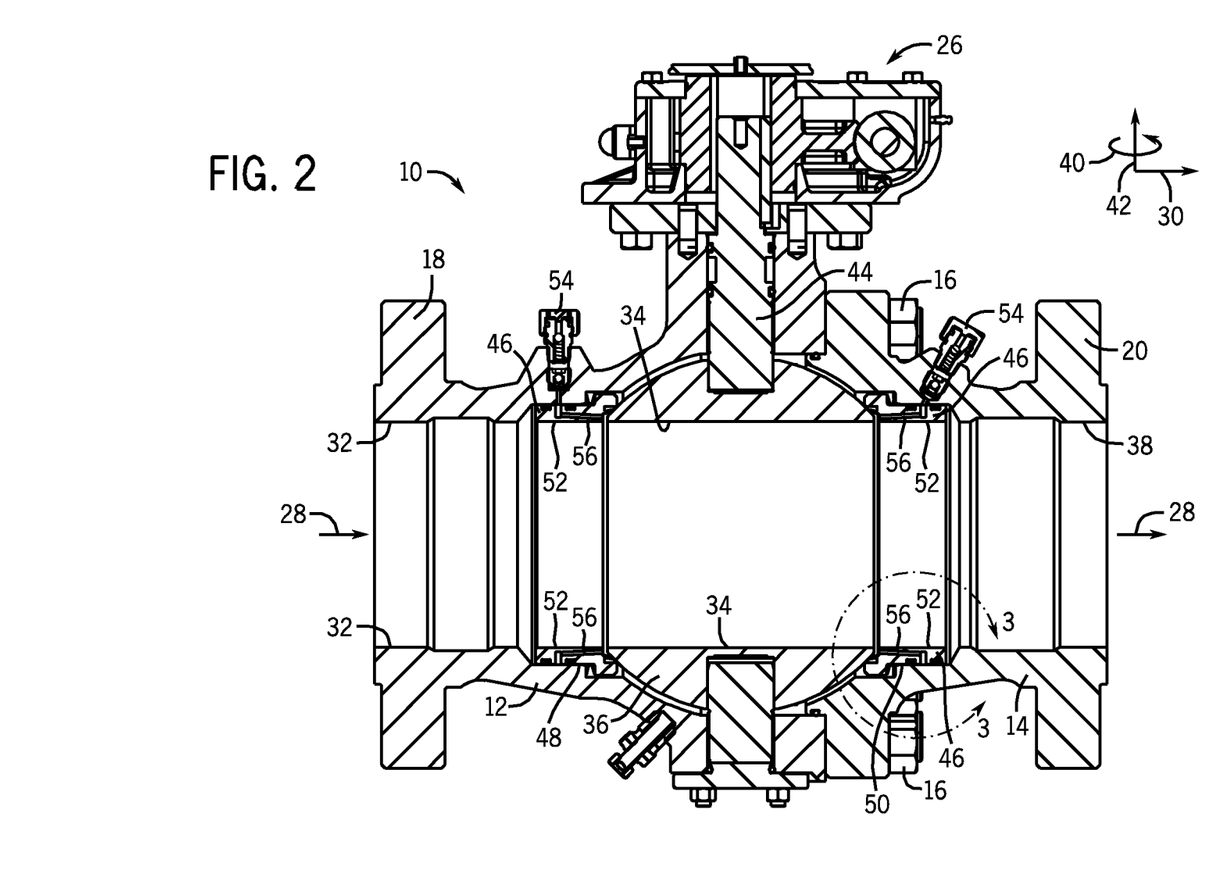
FIG. 2 is a cross-sectional side view of the ball valve of FIG. 1.

FIG. 2 is a cross-sectional side view of the ball valve 10 of FIG. 1. As illustrated, the ball valve 10 is in the open position, thereby facilitating a flow of fluid 28 in an axial direction 30. Specifically, the fluid enters a bore 32 of the body 12, flows through a bore 34 of a ball 36, and exits a bore 38 of the adapter 14. As illustrated, the ball 36 is configured to fit between the body 12 and the adapter 14. As described above and illustrated by arrow 40, the ball 36 may rotate about a radial axis 42 to enable or block the flow of fluid 28 through the ball valve 10. Rotation of the ball 36 varies the flow area between the bores 32, 38 of the body 12 and the adapter 14 and the bore 34 of the ball 36, thereby adjusting the flow rate of fluid 28. In other words, rotation of the ball 36 may enable or block the flow of the fluid 28 through the body 12 and the adapter 14 of the ball valve 10. To facilitate rotation of the ball 36, a stem 44 is rotationally coupled to the ball 36. In general, the fluid 28 may enter through either the body 12 or the adapter 14 and exit through the other. For example, in the illustrated embodiment, the fluid 28 enters through the body 12, and exits through the adapter 14. However, in other embodiments, the fluid 28 may enter through the adapter 14 and exit through the body 12.

As illustrated in FIG. 2, the ball valve 10 also includes two annular seat rings 46, with each seat ring 46 disposed on either side of the ball 36. More specifically, one seat ring 46 is disposed between the ball 36 and the body 12 and the other seat ring 46 is disposed between the ball 36 and the adapter 14. Each seat ring 46 comprises an annular body that fits within a respective bore 48, 50 of the body 12 or adapter 14 and abuts the ball 36 when the body 12, the seat rings 46, the ball 36, and the adapter 14 are assembled together. For example, the bore 48 of the body 12 is a bore axially adjacent the bore 32 of the body 12 described above, and the bore 50 of the adapter 14 is a bore axially adjacent to the bore 38 of the adapter 14 described above. In general, the bore 48 of the body 12 has a larger diameter than the bore 32 of the body 12, and the bore 50 of the adapter 14 has a larger diameter than the bore 38 of the adapter 14, such that the seat rings 46 fit within the bores 48, 50 when the body 12, the seat rings 46, the ball 36, and the adapter 14 are assembled together. Furthermore, in certain embodiments, the bore 32 of the body 12, annular inner walls 52 of the seats rings 46, the bore 34 of the ball 36, and the bore 38 of the adapter 14 are all generally concentric having substantially similar inner diameters when the body 12, the seat rings 46, the ball 36, and the adapter 14 are assembled together.

When the ball valve 10 is assembled, the seat rings 46 create a seal between the ball 36 and the body 12 and between the ball 36 and the adapter 14. More specifically, as described in greater detail below, a linear energizing device associated with each seat ring 46 biases the respective seat ring 46 against the ball 36 to create the seal. In addition, in certain embodiments, the ball valve 10 includes a plurality of injection ports 54 that are configured to align with and enable fluid communication with injection channels 56 in the seat rings 46. The injection ports 54 and injection channels 56 facilitate the delivery of lubricating or sealant fluids to the interfaces between the seat rings 46 and the ball 36. The lubricating fluids counteract the frictional forces generated between the ball 36 and the seat rings 46 when the ball 36 is rotated between open and closed positions.

Figure 3:
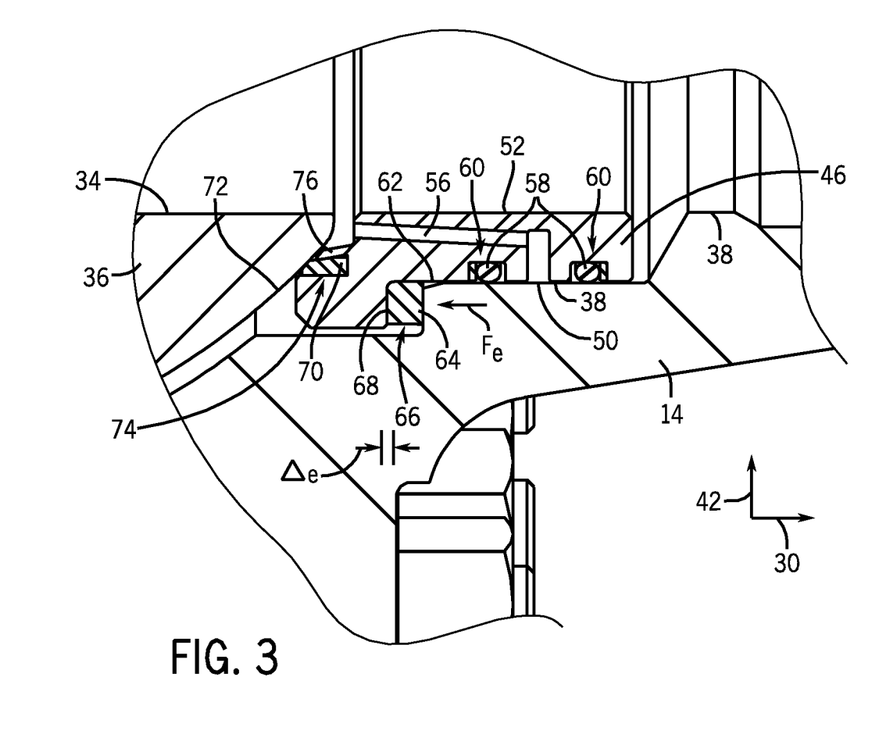
FIG. 3 is a partial cross-sectional side view of an exemplary embodiment of a ball, a seat ring, and an adapter of the ball valve of FIG. 2, depicting the use of a linear energizing device.

FIG. 3 is a partial cross-sectional side view of an exemplary embodiment of the ball 36, the seat ring 46, and the adapter 14 of the ball valve 10 of FIG. 2, depicting the use of an annular linear energizing device. Although FIG. 3 illustrates the manner in which the ball 36, the seat ring 46, and the adapter 14 interact, the interaction between the other seat ring 46, the ball 36, and the body 12 are substantially similar on the opposite side of the ball 36. As illustrated, each seat ring 46 may be associated with annular ring seals 58 that are held in position between the seat ring 46 and the bores 48, 50 (e.g., the adapter bore 50 as illustrated in FIG. 3) within grooves 60 on an outer annular wall 62 of the seat ring 46. The ring seals 58 provide sealing of the seat ring 46 to the body 12 or adapter 14.

As illustrated in FIG. 3, each seat ring 46 is also associated with an annular linear energizing device 64 that provides a linear energizing force $F_e$ in the axial direction 30. More specifically, the linear energizing force $F_e$ linearly biases the seat ring 46 against the ball 36 when the ball 36, the seat rings 46, the linear energizing devices 64, the body 12, and the adapter 14 are assembled together. In other words, as described in greater detail below, the energizing force $F_e$ generated by axial movement of the seat ring 46 is linear or substantially linear (i.e., proportional or substantially directly proportional) to the amount of axial movement.

As illustrated, in certain embodiments, the linear energizing device 64 may be located in a cavity 66 defined between the outer annular wall 62 of the seat ring 46, the bore 48, 50 of the body 12 or adapter 14 (e.g., the adapter bore 50 as illustrated in FIG. 3), and a radial surface 68 (e.g., an annular lip) that extends from the outer annular wall 62 of the seat ring 46. As described in greater detail below, in certain embodiments, the linear energizing device 64 may be an annular cantilevered v-shaped (or u-shaped) spring configured to generate the linear energizing force $F_e$ when the seat ring 46 moves axially against the linear energizing device 64. However, in other embodiments, the linear energizing device 64 may be any device suitable for providing the linear energizing force $F_e$.

As described above, the linear energizing force $F_e$ linearly biases the seat ring 46 against the ball 36 when the ball 36, the seat rings 46, the linear energizing devices 64, the body 12, and the adapter 14 are assembled together. However, the body of the seat ring 46 does not actually physically contact the ball 36. Rather, an annular seat insert 70 is used to physically contact a surface 72 of the ball 36. More specifically, as described in greater detail below, the seat insert 70 is an annular ring that fits within an annular groove 74 in the annular seat ring 46. As illustrated, the groove 74 includes a contoured profile that extends around the annular seat ring 46. As illustrated in FIG. 3, the seat insert 70 may be held in place within the groove 74 of the seat ring 46 by a lip portion 76 that is deformed against the seat insert 70 when the seat ring 46 and seat insert 70 are assembled. However, in other embodiments, the seat insert 70 may be held in place within the groove 74 by any other suitable retainers.

In certain embodiments, the seat ring 46 may generally be made from a metallic material, while the seat insert 70 may be made from a plastic material such that the physical contact between the ball 36 and the seat insert 70 slightly compresses the seat insert 70. Using a plastic seat insert 70 eliminates the metal-on-metal contact that would otherwise exist between the ball 36 and the seat insert 70, and provides elastic sealing properties.

As described above, the linear energizing device 64 of FIG. 3 provides a linear energizing force $F_e$ that biases the seat ring 46 and, more specifically, the seat insert 70 against the ball 36 in a linear fashion. In other words, axial movement $\Delta_e$ of the seat ring 46 relative to the adapter 14 and the energizing force $F_e$ generated between the seat ring 46 and the ball 36 are substantially directly proportional. For example, in certain embodiments, for all axial movement $\Delta_e$ of the seat ring 46 relative to the adapter 14, the ratio of the resulting energizing force $F_e$ divided by the axial movement $\Delta_e$ may be within a range of values with minimum and maximum values separated by 20%, 15% 10%, 5%, or even less. In other words, the amount of the resulting energizing force $F_e$ may be substantially directly proportional to the axial movement $\Delta_e$, such that a curve (see, e.g., FIG. 5) of the energizing force $F_e$ versus the axial movement $\Delta_e$ is linear or substantially linear (e.g., with all points on the curve falling within a range of 20%, 15% 10%, 5%, or even less, of an ideal linear curve).

Figure 4:
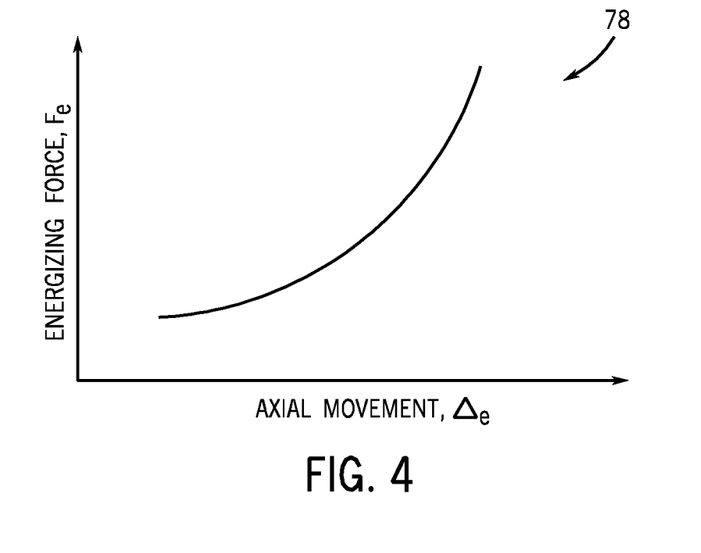
FIG. 4 is a chart of the relationship of axial movement of a seat ring and the resulting energizing force generated between the seat ring and a ball associated with energizing devices in conventional ball valves.
Figure 5:
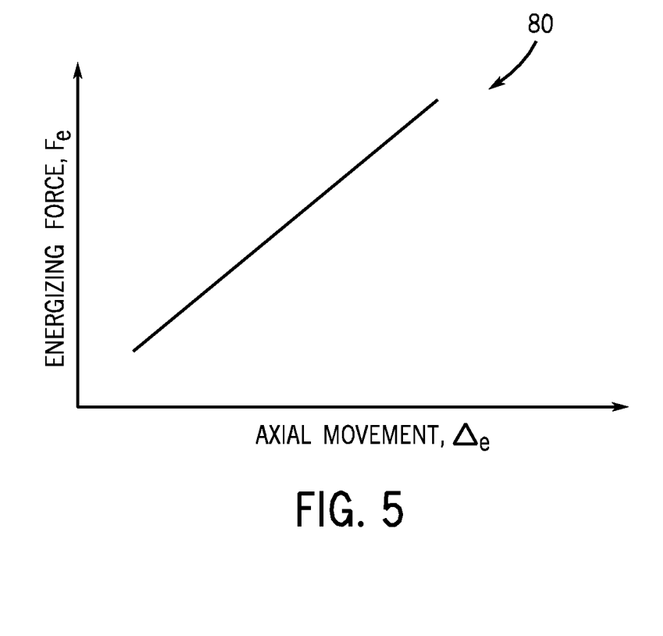
FIG. 5 is a chart of the relationship of axial movement of the seat ring and the resulting linear energizing force generated between the seat ring and the ball of FIG. 3.

In contrast, conventional energizing devices tend to generate energizing forces $F_e$ that are non-linear with respect to the axial movement $\Delta_e$ of the seat ring relative to the adapter (or body). For example, FIG. 4 is a chart 78 of the relationship of axial movement $\Delta_e$ of a seat ring and the resulting energizing force $F_e$ generated between the seat ring and a ball associated with energizing devices in conventional ball valves. As illustrated in FIG. 4, with conventional energizing devices, as the axial movement $\Delta_e$ between the seat ring and the adapter (or body) increases, the energizing force $F_e$ increases somewhat exponentially, as opposed to linearly. Conversely, as described above, the linear energizing device 64 described herein generates a resulting energizing force $F_e$ that is linear or substantially linear with respect to the axial movement $\Delta_e$ between the seat ring 46 and the adapter 14 (or body 12). For example, FIG. 5 is a chart 80 of the relationship of axial movement $\Delta_e$ of the seat ring 46 and the resulting linear energizing force $F_e$ generated between the seat ring 46 and the ball 36 of FIG. 3. As illustrated in FIG. 5, as the axial movement $\Delta_e$ between the seat ring 46 and the adapter 14 (or body 12) increases, the energizing force $F_e$ increases linearly or substantially linearly, as opposed to exponentially. In other words, the linear energizing device 64 described herein creates a linear force curve (i.e., along the straight line of FIG. 5).

Figure 6A:
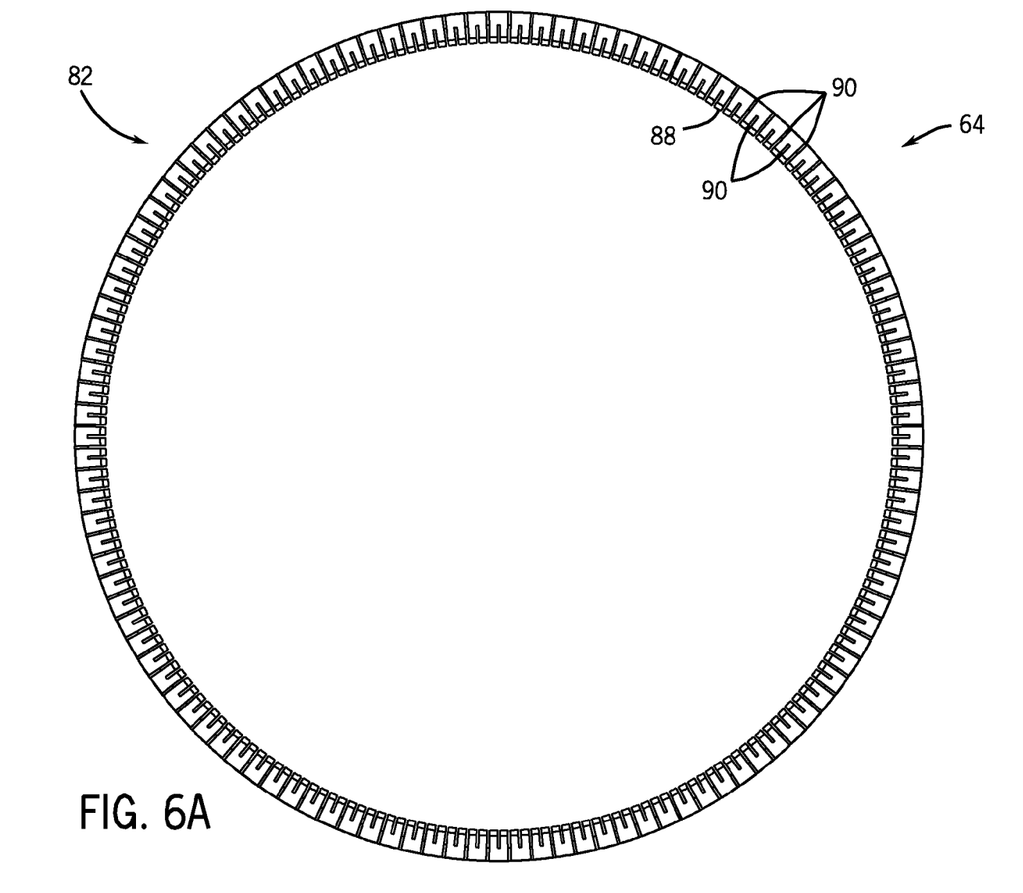
FIG. 6A is an axial view of an exemplary annular cantilevered v-shaped spring taken along the axial direction.
Figure 6B:
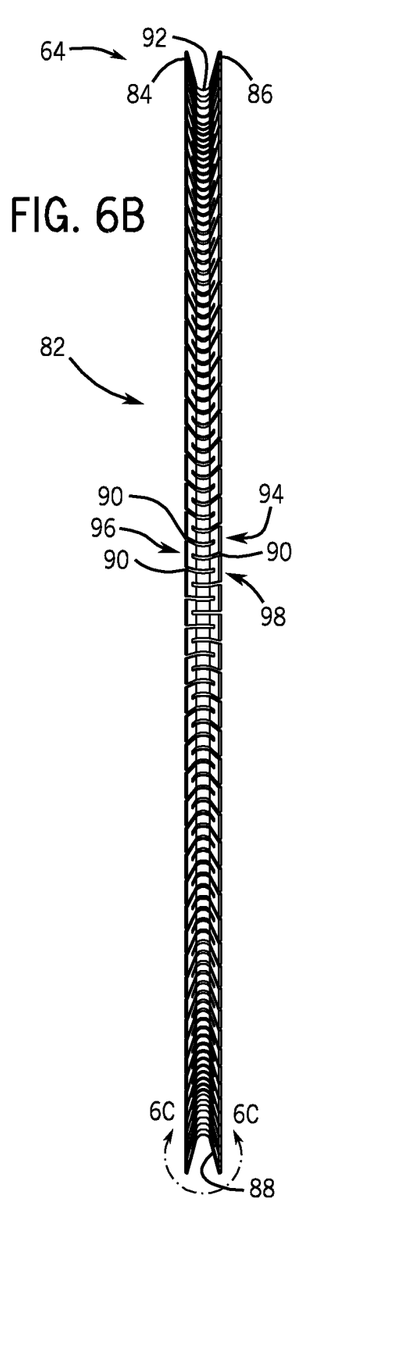
FIG. 6B is a side view of the exemplary annular cantilevered v-shaped spring taken along the radial direction.
Figure 6C:
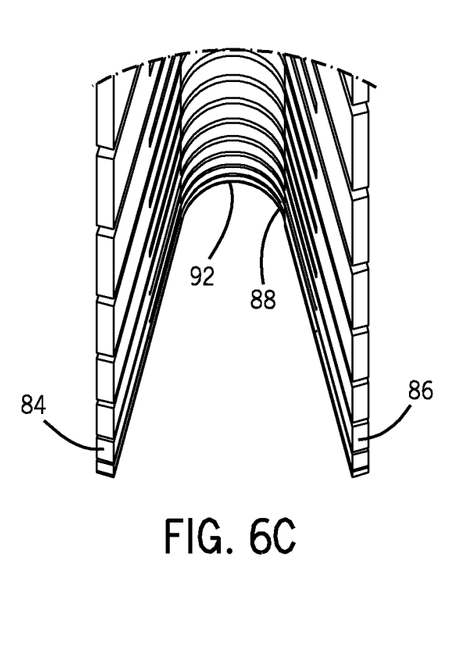
FIG. 6C is a cutaway view of the exemplary annular cantilevered v-shaped spring of FIG. 6B taken along line 6C.

As described above, in certain embodiments, the linear energizing device 64 of FIG. 3 may be an annular cantilevered v-shaped (or u-shaped) spring 82. For example, FIG. 6A is an axial view of an exemplary annular cantilevered v-shaped spring 82 taken along the axial direction 30, and FIG. 6B is a side view of the exemplary annular cantilevered v-shaped spring 82 taken along the radial direction 42. As illustrated in FIGS. 6B and 6C, the cantilevered v-shaped spring 82 may have a generally constant v-shaped cross-sectional profile. More specifically, the cantilevered v-shaped spring 82 includes a pair of legs 84, 86 (e.g., annular protrusions) that extend from a curved end 88 (e.g., an annular base) of the cantilevered v-shaped spring 82, thereby forming a generally v-shaped cross-sectional profile. However, in certain embodiments, depending on the amount of curvature of the curved end 88 and the angles between the curved end 88 and the legs 84, 86, the cross-sectional profile of the cantilevered v-shaped spring 82 may be more accurately described as u-shaped.

In addition, as illustrated in FIGS. 6A and 6B, in certain embodiments, the cantilevered v-shaped spring 82 may include a series of alternating slots 90 that extend from an apex 92 of the curved end 88 through the legs 84, 86 to enable flexure of the legs 84, 86 in the axial direction 30 as well as circumferential flexure of the cantilevered v-shaped spring 82. In other words, as illustrated in FIG. 6B, a first slot 90 may extend from the apex 92 of the curved end 88 through the first leg 84 at a first circumferential location 94, a second slot 90 may extend from the apex 92 of the curved end 88 through the second leg 86 at a second circumferential location 96 (e.g., the next circumferential location), a third slot 90 may extend from the apex 92 of the curved end 88 through the first leg 86 at a third circumferential location 98 (e.g., the next circumferential location), and so forth, around the circumference of the annular cantilevered v-shaped spring 82. As such, the annular cantilevered v-shaped spring 82 forms a somewhat zig-zag shaped pattern around the circumference of the annular cantilevered v-shaped spring 82.

Figure 7:
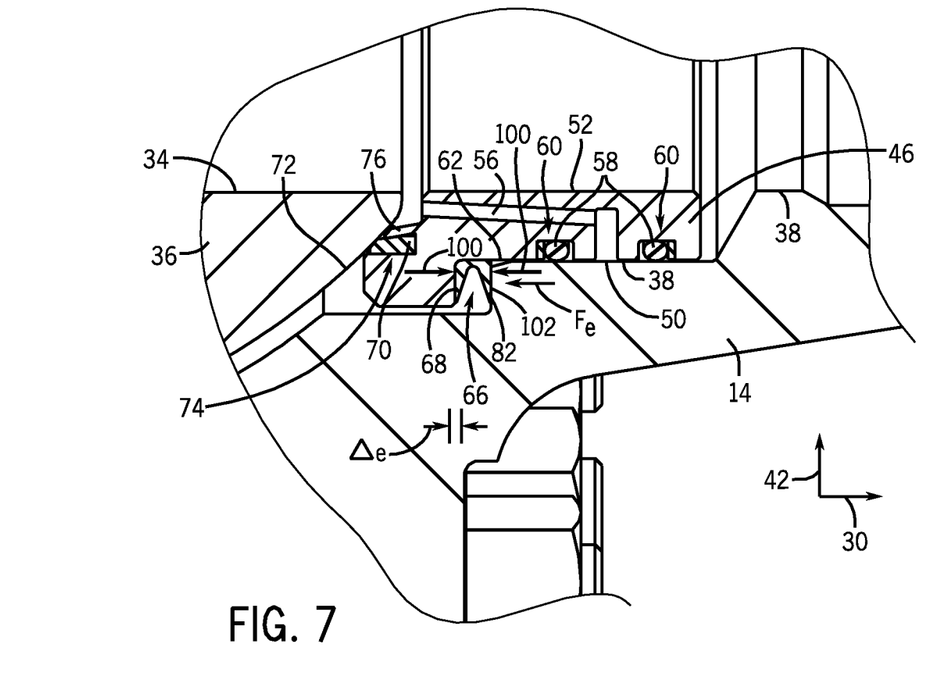
FIG. 7 is a partial cross-sectional side view of the ball, the seat ring, and the adapter of FIG. 3, depicting the use of the annular cantilevered v-shaped spring of FIGS. 6A and 6B as the linear energizing device.

In certain embodiments, the annular cantilevered v-shaped spring 82 of FIGS. 6A and 6B may be used as the linear energizing device 64 of FIG. 3. For example, FIG. 7 is a partial cross-sectional side view of the ball 36, the seat ring 46, and the adapter 14 of FIG. 3, depicting the use of the annular cantilevered v-shaped spring 82 of FIGS. 6A and 6B as the linear energizing device 64. As illustrated, as the ball 36 moves axially against the seat ring 46 and, more specifically, the seat insert 70 (as depicted by the axial movement $\Delta_e$), the two legs 84, 86 of the cantilevered v-shaped spring 82 are compressed in the axial direction 30, as illustrated by arrows 100. More specifically, the legs 84, 86 of the cantilevered v-shaped spring 82 are compressed between the radial surface 68 (e.g., annular lip) that extends from the outer annular wall 62 of the seat ring 46 and a radial surface 102 (e.g., annular lip) that extends from the adapter bore 50 of the adapter 14. As such, the energizing force $F_e$ is generated in the axial direction 30, forcing the seat ring 46 (and the seat insert 70) back against the ball 36. As described above, the nature of the cantilevered v-shaped spring 82 ensures that the generated energizing force $F_e$ is linear or substantially linear. In other words, the axial movement $\Delta_e$ of the seat ring 46 due to physical contact with the ball 36 and the generated energizing force $F_e$ are substantially directly proportional (i.e., characterized by a linear or substantially linear distance-force relationship), as illustrated in FIG. 5.

It is noted that the cantilevered v-shaped spring 82 described herein is a continuous annular spring that extends all the way around the annular seat ring 46 when assembled in the cavity 66 between the seat ring 46 and the adapter 14 (or the body 12). In other words, as opposed to being a series of discrete spring elements disposed within the cavity 66 between the seat ring 46 and the adapter 14 (or the body 12), the cantilevered v-shaped spring 82 extends all the way around the cavity 66 in the circumferential direction. This enables the cantilevered v-shaped spring 82 to apply a generally constant linear energizing force $F_e$ against the radial surface 68 of the seat ring 46 across the entire circumference of the radial surface 68, thereby forcing the seat ring 46 and, more specifically, the seat insert 70 against the ball in a more uniform manner.

In addition, it is also noted that the cantilevered v-shaped spring 82 has a generally constant cross-sectional profile, as described above with respect to FIGS. 6A and 6B. This also enables the distribution of the energizing force $F_e$ from the seat ring 46 against the ball 36 to be more uniform. In other words, because of the geometry of the cantilevered v-shaped spring 82, the cantilevered v-shaped spring 82 physically contacts the radial surface 68 of the seat ring 46 and the radial surface 102 that extends from the adapter bore 50 of the adapter 14 (or body 12) substantially continuously across the circumference of the annular cantilevered v-shaped spring 82, seat ring 46, and adapter 14 (or body 12). As such, an even and relatively constant load distribution is generated, enhancing sealing capability between the seat ring 46 (and, more specifically, the seat insert 70) and the ball 36 of the ball valve 10.

An advantage of the disclosed embodiments is that the linear energizing device 64 (e.g., the cantilevered v-shaped spring 82) is characterized by a linear or substantially linear force curve with a well-defined load per unit deflection. In addition, physical contact between the linear energizing device 64 (e.g., the cantilevered v-shaped spring 82) and the seat ring 46 and the bore 50 of the adapter 14 (or body 12) is maintained in a continuous manner around the circumference of the linear energizing device 64 (e.g., the cantilevered v-shaped spring 82), seat ring 46, and the bore 50 of the adapter 14 (or body 12). Both of these characteristics contribute to the linear energizing device 64 (e.g., the cantilevered v-shaped spring 82) creating a more reliable and consistent seal between the seat ring 46 (e.g., the seat insert 70) and the ball 36 of the ball valve 10.

An additional advantage of the disclosed embodiments is that no specially machined geometry is required in the ball valve 10. Rather, for example, the annular linear energizing device 64 (e.g., the cantilevered v-shaped spring 82) may be configured to fit within the cavity 66 that already exists between the seat ring 46 and the bore 50 of the adapter 14 (or body 12). As such, the linear energizing device 64 (e.g., the cantilevered v-shaped spring 82) may be retrofitted into existing ball valves 10 with relatively minimal modification. Furthermore, no specialized assembly techniques are required to assemble the linear energizing device 64 (e.g., the cantilevered v-shaped spring 82) between the seat ring 46 and the bore 50 of the adapter 14 (or body 12).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A ball valve, comprising:
   a body;
   an adapter coupled to the body;
   a ball disposed between the body and the adapter and configured to rotate about a radial axis to allow or block a flow of fluid along a fluid flow path through a body passage and an adapter passage; and
   a first valve seat assembly disposed between the body and the ball, and a second valve seat assembly disposed between the adapter and the ball, both the first and second valve seat assemblies comprising:
   a valve seat; and
   a one-piece energizing device external from the valve seat, wherein the one-piece energizing device is configured to generate an energizing force in an axial direction to force the valve seat axially against the ball, wherein the energizing force is substantially directly proportional to an axial movement of the valve seat with respect to the respective body or adapter, such that the energizing force changes only in a substantially linear manner relative to the axial movement over a full range of movement of the valve seat, wherein the one-piece energizing device is disposed adjacent a lip of the valve seat at an intermediate position at offset distances from both first and second axial ends of the valve seat.

2. The ball valve of claim 1, wherein the valve seat comprises an annular seat ring disposed within an inner bore of the respective body or adapter, and the one-piece energizing device comprises an annular spring disposed radially between the annular seat ring and the inner bore.

3. The ball valve of claim 2, wherein the annular spring comprises a generally constant cross-sectional profile in a circumferential direction about an axis of the annular spring.

4. The ball valve of claim 1, wherein the one-piece energizing device comprises an annular cantilevered spring having a generally v-shaped cross-sectional profile in a circumferential direction about an axis of the one-piece energizing device.

5. The ball valve of claim 4, wherein the generally v-shaped cross-sectional profile of the cantilevered spring comprises first and second legs extending from a curved end.

6. The ball valve of claim 5, wherein the first leg is configured to physically contact the valve seat, and the second leg is configured to physically contact an inner bore of the respective body or adapter.

7. The ball valve of claim 4, wherein the annular cantilevered spring comprises a metallic annular cantilevered spring.

8. The ball valve of claim 5, wherein the annular cantilevered spring comprises a series of alternating slots in the curved end and the legs of the cross-sectional profile of the annular cantilevered spring.

9. The system of claim 1, wherein the lip comprises an annular lip, the valve seat comprises an annular seat ring having the annular lip, the one-piece energizing device is disposed adjacent the annular lip of the annular seat ring at the intermediate position at the offset distances from both the first and second axial ends of the annular seat ring, and the one-piece energizing device comprises an annular cantilevered spring disposed axially between the annular lip of the annular seat ring and a mating annular lip of an inner bore of the respective body or adapter.

10. The system of claim 9, comprising at least one seal disposed in at least one respective groove along the annular seat ring, wherein the one-piece energizing device is disposed axially between the annular lip and the first axial end of the annular seat ring, and the at least one seal is disposed axially between the one-piece energizing device and the first axial end of the annular seat ring.

11. The system of claim 9, wherein the annular seat ring comprises an annular seat insert disposed in an annular groove, and the annular seat ring comprises a lip portion extending over the seat insert.

12. The system of claim 9, comprising a passage extending through the annular seat ring from a first opening to a second opening, wherein the one-piece energizing device is disposed axially between the annular lip and the first axial end of the annular seat ring, and the first opening of the passage is disposed axially between the one-piece energizing device and the first axial end of the annular seat ring.

13. The ball valve of claim 1, wherein the one-piece energizing device of the first or second valve seat assembly is disposed about an outer circumference of an annular seat ring opposite from an inner circumference of the annular seat ring along the fluid flow path.

14. The ball valve of claim 1, wherein the energizing force changes only in the substantially linear manner within a range of 10 percent or less of a linear curve relative to the axial movement over the full range of movement of the first or second valve seat assembly.

15. The ball valve of claim 1, wherein the valve seat comprises an annular seat insert disposed in an annular groove of an annular seat ring, the annular seat ring comprises the lip being an annular lip, the one-piece energizing device comprises an annular spring disposed adjacent the annular lip, the annular seat insert comprises a plastic, the annular seat ring comprises metal, and the annular spring comprises metal.

16. The ball valve of claim 15, wherein the ball comprises metal.

17. The ball valve of claim 15, wherein the annular spring comprises a cross-sectional profile defined by first and second legs coupled together at an end, the cross-sectional profile extends in a circumferential direction about an axis of the annular spring, the annular spring comprises a plurality of slots spaced apart from one another in the first and second legs, and the annular spring having the first and second legs coupled together at the end is a single continuous structure made metal.

18. The ball valve of claim 17, wherein the plurality of slots alternate between the first and second legs in the circumferential direction about the axis of the annular spring.

19. The ball valve of claim 18, wherein the annular spring is configured to flex in the circumferential direction and an axial direction relative to the axis of the annular spring.

20. The ball valve of claim 17, wherein the energizing force changes only in the linear manner relative to the axial movement over the full range of movement of the valve seat.

21. A ball valve, comprising:
a body;
an adapter coupled to the body;
a ball disposed between the body and the adapter and configured to rotate about a radial axis to allow or block a flow of fluid along a fluid flow path through a body passage and an adapter passage; and
a first valve seat assembly disposed between the body and the ball, and a second valve seat assembly disposed between the adapter and the ball, both the first and second valve seat assemblies comprising:
a valve seat having an annular seat ring disposed within an inner bore of the respective body or adapter; and
a one-piece energizing device external from the valve seat, wherein the one-piece energizing device is configured to generate an energizing force in an axial direction to force the valve seat axially against the ball, wherein the energizing force is substantially directly proportional to an axial movement of the valve seat with respect to the respective body or adapter, such that the energizing force changes only in a substantially linear manner relative to the axial movement over a full range of movement of the valve seat, wherein the one-piece energizing device comprises an annular spring disposed between the annular seat ring and the inner bore, wherein the annular spring comprises a generally constant cross-sectional profile in a circumferential direction about an axis of the annular spring, wherein the annular spring axially abuts only one side of the annular seat ring.

22. The ball valve of claim 21, wherein the valve seat comprises an annular seat insert disposed in an annular groove of the annular seat ring, the annular seat ring comprises an annular lip, the annular spring is disposed adjacent the annular lip, the annular seat insert comprises a plastic, the annular seat ring comprises metal, and the annular spring comprises metal.

23. The ball valve of claim 21, wherein the generally constant cross-sectional profile of the annular spring is defined by first and second legs coupled together at an end, the annular spring comprises a plurality of slots spaced apart from one another in the first and second legs, and the annular spring having the first and second legs coupled together at the end is a single continuous structure.

24. The ball valve of claim 23, wherein the plurality of slots alternate between the first and second legs in the circumferential direction about the axis of the annular spring.

25. The ball valve of claim 24, wherein the annular spring is configured to flex in the circumferential direction and an axial direction relative to the axis of the annular spring.

26. The ball valve of claim 24, wherein the energizing force changes only in the linear manner relative to the axial movement over the full range of movement of the valve seat.

27. The ball valve of claim 24, wherein the annular spring is disposed circumferentially about an outer circumference of the annular seat ring adjacent the annular lip at offset distances from both first and second axial ends of the annular seat ring.

28. A ball valve, comprising:
a body;
an adapter coupled to the body;
a ball disposed between the body and the adapter and configured to rotate about a radial axis to allow or block a flow of fluid along a fluid flow path through a body passage and an adapter passage; and
a first valve seat assembly disposed between the body and the ball, and a second valve seat assembly disposed between the adapter and the ball, both the first and second valve seat assemblies comprising:
a valve seat; and
a one-piece energizing device external from the valve seat, wherein the one-piece energizing device is configured to generate an energizing force in an axial direction to force the valve seat axially against the ball, wherein the energizing force is substantially directly proportional to an axial movement of the valve seat with respect to the respective body or adapter, such that the energizing force changes only in a substantially linear manner relative to the axial movement over a full range of movement of the valve seat;
wherein the one-piece energizing device comprises an annular cantilevered spring having a generally v-shaped cross-sectional profile in a circumferential direction about an axis of the one-piece energizing device;
wherein the generally v-shaped cross-sectional profile of the cantilevered spring comprises first and second legs extending from a curved end; and wherein the annular cantilevered spring comprises a series of alternating slots in the curved end and the legs of the cross-sectional profile of the annular cantilevered spring.

29. The ball valve of claim 28, wherein the valve seat comprises an annular seat insert disposed in an annular groove of an annular seat ring, the annular seat ring comprises an annular lip, the annular cantilevered spring is disposed adjacent the annular lip, the annular seat insert comprises a plastic, the annular seat ring comprises metal, and the annular cantilevered spring comprises metal.

30. The ball valve of claim 29, wherein the annular cantilevered spring is disposed circumferentially about an outer circumference of the annular seat ring adjacent the annular lip at offset distances from both first and second axial ends of the annular seat ring.

31. The ball valve of claim 28, wherein the annular cantilevered spring having the first and second legs extending from the curved end is a single continuous structure.

32. The ball valve of claim 28, wherein the annular cantilevered spring is configured to flex in the circumferential direction and an axial direction relative to the axis of the one-piece energizing device.

33. The ball valve of claim 28, wherein the energizing force changes only in the linear manner relative to the axial movement over the full range of movement of the valve seat.

* * * * *